US010865069B2

(12) United States Patent
Kottur et al.

(10) Patent No.: US 10,865,069 B2
(45) Date of Patent: Dec. 15, 2020

(54) EFFECTING COMMUNICATION BRIDGE WITH ELEVATOR SYSTEM

(71) Applicant: Otis Elevator Company, Farmington, CT (US)

(72) Inventors: Guru Charan Kottur, Telangana (IN); Tejas Arunrao Dhumal, Telangana (IN); Aditya Swami, Hyderabad (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/561,853

(22) Filed: Sep. 5, 2019

(65) Prior Publication Data

US 2020/0087106 A1 Mar. 19, 2020

(30) Foreign Application Priority Data

Sep. 18, 2018 (IN) .............................. 201811035079

(51) Int. Cl.
*B66B 1/34* (2006.01)
*H04W 4/33* (2018.01)
*H04W 4/80* (2018.01)

(52) U.S. Cl.
CPC .......... *B66B 1/3461* (2013.01); *B66B 1/3453* (2013.01); *H04W 4/33* (2018.02); *H04W 4/80* (2018.02)

(58) Field of Classification Search
CPC ...... B66B 1/3461; B66B 1/3453; H04W 4/33; H04W 4/80
USPC ...................................................... 340/286.1
See application file for complete search history.

(56) References Cited

U.S. PATENT DOCUMENTS

| 6,175,733 | B1 | 1/2001 | Seekins et al. |
| 6,343,216 | B1 | 1/2002 | Kim et al. |
| 6,684,055 | B1 * | 1/2004 | Blackaby .................. B66B 1/34 340/12.3 |
| 7,376,389 | B2 * | 5/2008 | Bassiri .................. H04W 16/26 455/7 |
| 7,377,364 | B2 | 5/2008 | Tyni et al. |

(Continued)

FOREIGN PATENT DOCUMENTS

| CN | 101478738 B | 7/2009 |
| CN | 203167279 U | 8/2013 |

(Continued)

OTHER PUBLICATIONS

Extended European Search Report; Application No. 19198140.6; dated Feb. 24, 2020; 14 pages.

*Primary Examiner* — John A Tweel, Jr.
(74) *Attorney, Agent, or Firm* — Cantor Colburn LLP

(57) ABSTRACT

Disclosed is an elevator system having an elevator including a controller, wherein the controller is configured to communicate over a plurality of networks with a plurality of devices, the plurality of networks including a first network and a second network and the plurality of devices including a first device and a second device, the first device being within or proximate the elevator, wherein the plurality of devices are configured to communicate over a third network, and wherein, while the plurality of devices are communicating over the third network, the controller selectively effects a communications bridge over the plurality of networks between the plurality of devices and supersedes the communication over the third network.

18 Claims, 3 Drawing Sheets

(56) References Cited

U.S. PATENT DOCUMENTS

| | | | |
|---|---|---|---|
| 7,706,522 B2 | 4/2010 | Shaffer et al. | |
| 7,764,978 B1 * | 7/2010 | West | H04B 7/2606 |
| | | | 455/561 |
| 8,891,751 B2 | 11/2014 | Cheung et al. | |
| 8,917,590 B2 | 12/2014 | Cazanas et al. | |
| 9,969,597 B2 * | 5/2018 | Beloin | B66B 1/3461 |
| 2007/0091907 A1 | 4/2007 | Seshadri et al. | |
| 2008/0014938 A1 | 1/2008 | Hart et al. | |
| 2008/0118047 A1 | 5/2008 | Nachum | |
| 2009/0215438 A1 | 8/2009 | Mittal et al. | |
| 2012/0051449 A1 * | 3/2012 | Bunter | B66B 5/0087 |
| | | | 375/259 |
| 2012/0068818 A1 | 3/2012 | Mizon | |
| 2016/0176678 A1 | 6/2016 | Kusserow | |
| 2016/0264377 A1 | 9/2016 | Beloin | |
| 2019/0389690 A1 * | 12/2019 | Pahlke | B66B 1/468 |

FOREIGN PATENT DOCUMENTS

| | | |
|---|---|---|
| CN | 104602214 A | 5/2015 |
| JP | 2003204398 A | 7/2003 |
| KR | 1020060018491 A | 3/2006 |

* cited by examiner

EFFECTING COMMUNICATION BRIDGE WITH ELEVATOR SYSTEM

CROSS-REFERENCE TO RELATED APPLICATIONS

This application claims the benefit of India Patent No. 201811035079 filed Sep. 18, 2018, the disclosure of which is incorporated herein by reference in its entirety.

BACKGROUND

The embodiments herein relate to communication bridges and more specifically to effecting a communications bridge with an elevator system.

A GSM (global system for mobile) signal inside an elevator may be weak or lost. Accordingly a passenger entering an elevator while on an active mobile call may become disconnected.

SUMMARY

Disclosed is an elevator system comprising an elevator including a controller, wherein the controller is configured to communicate over a plurality of networks with a plurality of devices, the plurality of networks including a first network and a second network and the plurality of devices including a first device and a second device, the first device being within or proximate the elevator, wherein the plurality of devices are configured to communicate over a third network, and wherein, while the plurality of devices are communicating over the third network, the controller selectively effects a communications bridge over the plurality of networks between the plurality of devices and supersedes the communication over the third network.

In addition to one or more of the above the disclosed features or as an alternate the first network, the second network and the third network apply mutually different protocols and communicate on mutually different frequencies.

In addition to one or more of the above the disclosed features or as an alternate the first network is a personal area network, the second network is a wide area network, and the third network is a cellular network.

In addition to one or more of the above the disclosed features or as an alternate the controller obtains a communications address for the second device from the first device.

In addition to one or more of the above the disclosed features or as an alternate after effecting the communications bridge, the controller selectively terminates the communications bridge to resume communications between the plurality of devices over the third network or terminate communications between the plurality of devices.

In addition to one or more of the above the disclosed features or as an alternate the elevator includes an interactive panel and prior to effecting the communications bridge, the controller receives a first request through the panel to effect the communications bridge.

In addition to one or more of the above the disclosed features or as an alternate prior to terminating the communications bridge, the controller receives a second request through the interactive panel to terminate the communications bridge.

In addition to one or more of the above the disclosed features or as an alternate the controller applies VoIP over the second network to effect the bridge.

In addition to one or more of the above the disclosed features or as an alternate the controller is configured to receive a plurality of first requests from a respective plurality of first devices including the first device that are within or proximate the elevator to effect a respective plurality of mutually independent bridges with a respective plurality of second devices including the second device.

In addition to one or more of the above the disclosed features or as an alternate the controller is configured to independently effect and terminate the respective plurality of bridges.

Further disclosed is a method of effecting a communication bridge with an elevator system, the elevator system comprising one or more of the above disclosed features.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
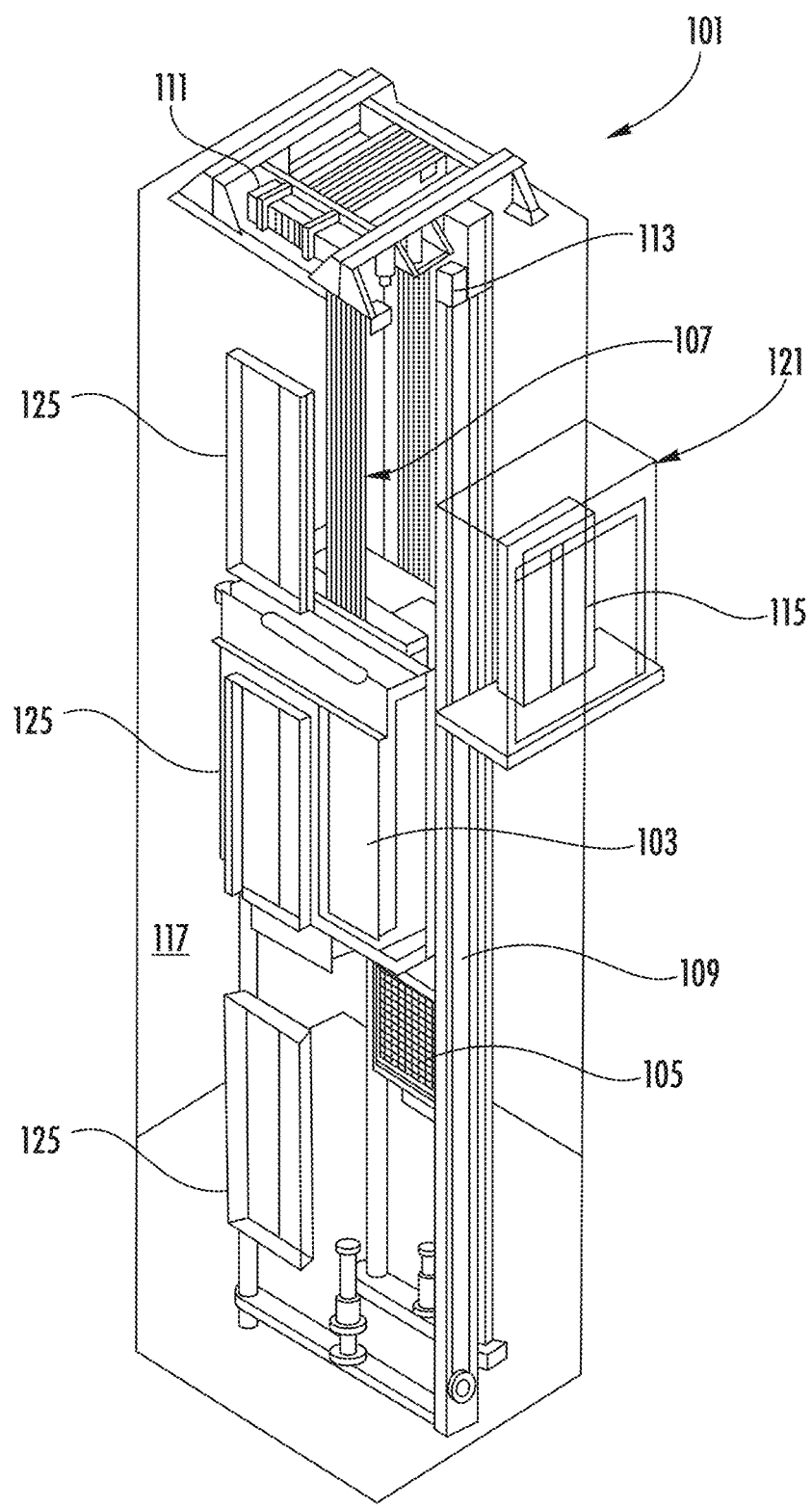
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
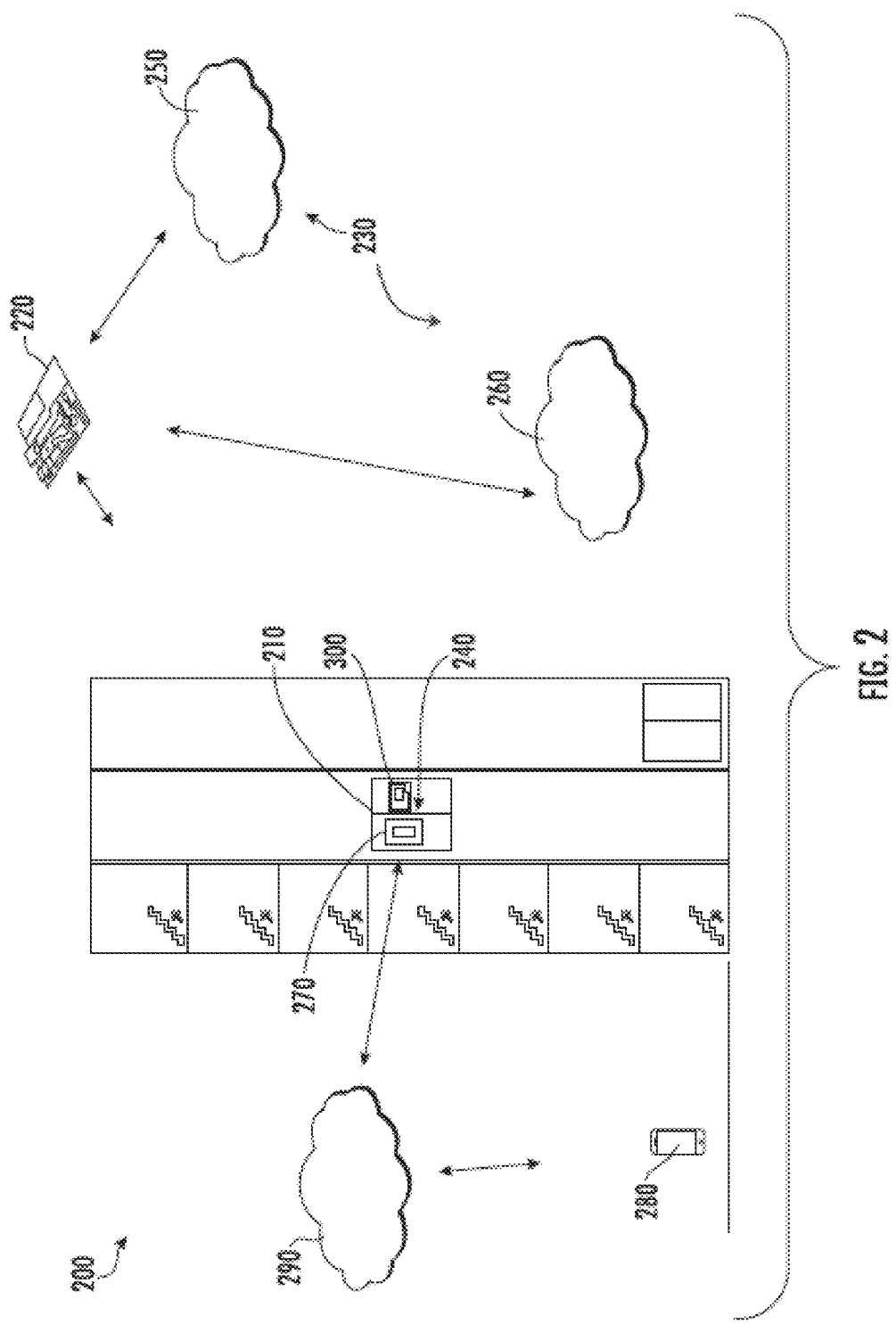
FIG. 2 illustrates additional features that may be included of one or more of the disclosed embodiments.

Turning to FIG. 2, the figure illustrates an elevator system generally referred to as 200. The system 200 may include an elevator 210 including a controller 220, wherein the controller 220 may be capable of communicating over a plurality of networks generally referred to as 230, and with a plurality of devices generally referred to as 240. The plurality of networks 230 may include a first network 250 and a second network 260 and the plurality of devices may 240 include a first device 270 and a second device 280. The first device 270 may be within or proximate the elevator 210. In addition, the plurality of devices 240 may be capable of communicating over a third network 290. The plurality of devices 240 may be used by a respective plurality of persons where the person using the first device 270 may be an elevator passenger.

Figure 3:
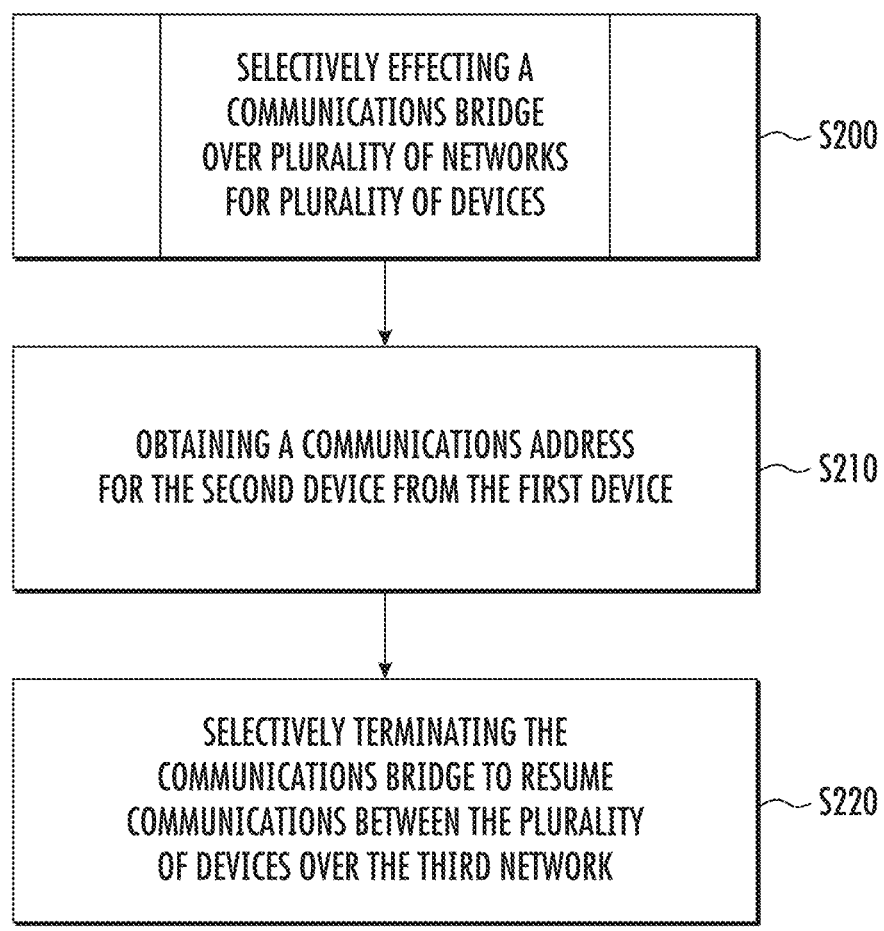
FIG. 3 illustrates a process that may be executed by one or more of the disclosed embodiments.

Turning to FIG. 3, while the plurality of devices 240 are communicating over the third network 290, the controller 220 may perform a process S200 of selectively effecting a communications bridge over the plurality of networks 230 for the plurality of devices 240. The communications bridge may supersede the communication over the third network 290.

In one embodiment the first network 250, the second network 260 and the third network 290 may apply mutually different protocols and communicate on mutually different frequencies. In one embodiment the first network 250 may be a personal area network, the second network may be is a wide area network, and the third network 290 may be a cellular network.

In performing process S200, the controller 220 may perform step S210 of obtaining a communications address for the second device 280 from the first device 270. In performing process S200, the controller 220 may perform step S220 of selectively terminating the communications bridge to resume communications between the plurality of devices 240 over the third network 290 or terminate communications between the plurality of devices 240.

Turing back to FIG. 2, the elevator 210 may include an interactive panel 300. In one embodiment prior to effecting the communications bridge, the controller 220 may receive a first request through the panel 300 to effect the communications bridge. In one embodiment prior to terminating the communications bridge, the controller 220 may receive a second request through the interactive panel 300 to terminate the communications bridge.

In one embodiment the controller 220 applies VOID over the second network 260 to effect the bridge. In addition the controller 220 may apply Bluetooth over the first network 250 to effect the bridge.

In one embodiment the controller 220 may be capable of receiving a plurality of first requests from a respective plurality of first devices including the first device 270 that are within or proximate the elevator 210. The plurality of first requests may be to effect a respective plurality of mutually independent bridges with a respective plurality of second devices including the second device 280. According to an embodiment the controller 220 may be capable of independently effecting and terminating the respective plurality of bridges.

According to the above description, passengers entering an elevator while on a mobile call may have the call transferred to an elevator communication system, which may initiate a voice over IP (VoIP) call to link the parties. Any passenger desiring to transfer the active call from a mobile phone to an elevator system, which may support VoIP calling, may do so thorough their mobile device by (1) having the mobile device communicate with the elevator controller and to have an option to transfer the live call to the elevator communication system, (2) accept the option, (3) sends a Bluetooth signal to elevator controller with calling parties credentials, including caller identifications, (4) the elevator controller may initiate a session initiation protocol (SIP) call to the remote party, thus handling SIP headers, and (5) on successfully connecting with the remote party, relays Real-time Transport Protocol (RTP) packets to the local mobile device over Bluetooth, and (6) the local caller may end the VoIP connection through a control signal executed by the mobile device, and (7) the elevator controller may receive the termination signal from the local caller via the local caller device and send an electronic termination signal to the remote party with SIP "BYE" communications.

In one embodiment multiple simultaneous calls may be made connected through the elevator controller. The disclosed embodiments may provide a passenger experience that is enhanced for seamless mobile communications due to weak signals. The system may provide for emergency calls for users even in situations with weak signals.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising
    an elevator including a controller, wherein the controller is configured to communicate over a plurality of networks with a plurality of devices,
    the plurality of networks including a first network and a second network and the plurality of devices including a first device and a second device,
    the first device being within or proximate the elevator,
    wherein the plurality of devices are configured to communicate over a third network,
    wherein, while the plurality of devices are communicating over the third network, the controller selectively effects a communications bridge over the plurality of networks between the plurality of devices and supersedes the communication over the third network, and
    wherein the controller obtains a communications address for the second device from the first device.

2. The system of claim 1 wherein the first network, the second network and the third network apply mutually different protocols and communicate on mutually different frequencies.

3. The system of claim 2 wherein the first network is a personal area network, the second network is a wide area network, and the third network is a cellular network.

4. The system of claim 1 wherein after effecting the communications bridge, the controller selectively terminates the communications bridge to resume communications between the plurality of devices over the third network or terminate communications between the plurality of devices.

5. The system of claim 1 wherein the elevator includes an interactive panel and prior to effecting the communications bridge, the controller receives a first request through the panel to effect the communications bridge.

6. The system of claim 5 wherein prior to terminating the communications bridge, the controller receives a second request through the interactive panel to terminate the communications bridge.

7. The system of claim 1 wherein the controller applies VoIP over the second network to effect the communications bridge.

8. The system of claim 1 wherein the controller is configured to receive a plurality of first requests from a respective plurality of first devices including the first device that are within or proximate the elevator to effect a respective plurality of mutually independent communications bridges with a respective plurality of second devices including the second device.

9. The system of claim 8 wherein the controller is configured to independently effect and terminate the respective plurality of communications bridges.

10. A method of effecting a communications bridge with an elevator system, the elevator system comprising
    an elevator including a controller, wherein the controller is configured to communicate over a plurality of networks with a plurality of devices, the plurality of networks including a first network and a second network and the plurality of devices including a first device and a second device, the first device being within or proximate the elevator, wherein the plurality of devices are configured to communicate over a third network,
    wherein, while the plurality of devices are communicating over the third network, the method comprise the controller selectively effecting the communications bridge over the plurality of networks between the plurality of devices and supersedes the communication over the third network,
    wherein the controller obtains a communications address for the second device from the first device.

11. The method of claim 10 wherein the first network, the second network and the third network apply mutually different protocols and communicate on mutually different frequencies.

12. The method of claim 11 wherein the first network is a personal area network, the second network is a wide area network, and the third network is a cellular network.

13. The method of claim 10 wherein after effecting the communications bridge, the controller selectively terminates the communications bridge to resume communications between the plurality of devices over the third network or terminate communications between the plurality of devices.

14. The method of claim 10 wherein the elevator includes an interactive panel and prior to effecting the communications bridge, the controller receives a first request through the panel to effect the communications bridge.

15. The method of claim 14 wherein prior to terminating the communications bridge, the controller receives a second request through the interactive panel to terminate the communications bridge.

16. The method of claim 10 wherein the controller applies VoIP over the second network to effect the communications bridge.

17. The method of claim 10 wherein the controller is configured to receive a plurality of first requests from a respective plurality of first devices including the first device that are within or proximate the elevator to effect a respective plurality of mutually independent communications bridges with a respective plurality of second devices including the second device.

18. The method of claim 17 wherein the controller is configured to independently effect and terminate the respective plurality of communications bridges.

* * * * *